United States Patent

Mitsengendler

[15] 3,693,965
[45] Sept. 26, 1972

[54] TURNTABLE FOR FASTENING WORKPIECES DURING MACHINING

[72] Inventor: Iosif Salamonovich Mitsengendler, Sverdlovsk, U.S.S.R.

[73] Assignee: Uralsky Zavod Tyazhelogo mashinostroenia imeni, S. Ordzhonikidge, U.S.S.R.

[22] Filed: Nov. 3, 1970

[21] Appl. No.: 86,556

[52] U.S. Cl.............269/20, 214/1 BE, 269/56, 269/71, 408/90
[51] Int. Cl............................B23q 3/00, B25b 39/06
[58] Field of Search..........51/240 T, 232; 214/1 BE; 269/20, 22, 35, 55-74; 408/71, 89-91

[56] References Cited
UNITED STATES PATENTS 3,108,791  10/1963  Budney et al............269/55 X
3,232,141  2/1966  Swanson et al.............408/90
3,323,789  6/1967  McCann et al............269/35
3,376,764  4/1968  Schardt...................51/235 X Primary Examiner—Theron E. Condon
Assistant Examiner—Neil Abrams
Attorney—Holman & Stern

[57] ABSTRACT

A turntable for fastening workpieces during machining in which the work table holding the workpiece can be lifted above the bed and be turned and moved with relation thereto on a gas or liquid cushion.

3 Claims, 3 Drawing Figures

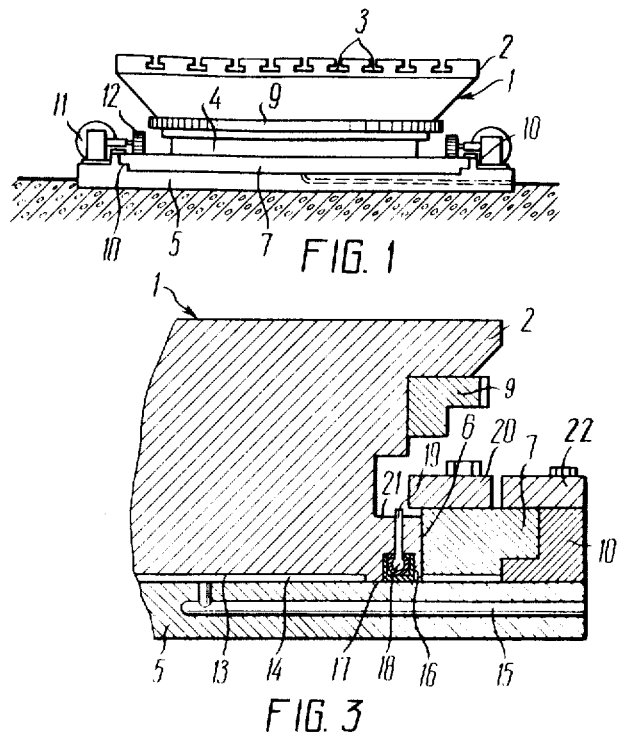
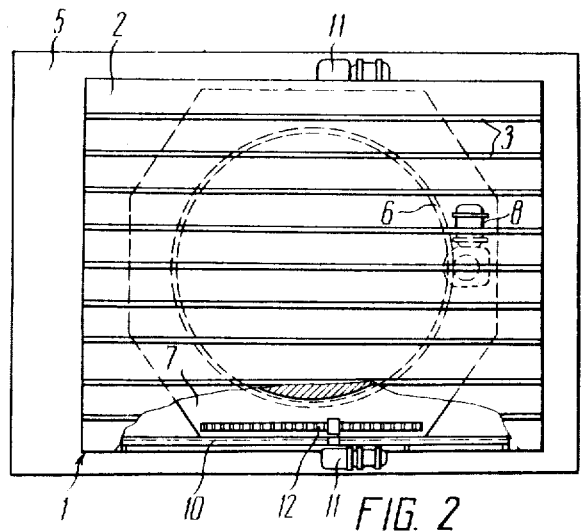

3,693,965

TURNTABLE FOR FASTENING WORKPIECES DURING MACHINING

BACKGROUND OF THE INVENTION

The present invention relates to the turntables used for securing workpieces during machining operations and more specifically to turntables for horizontal boring machines.

This invention is intended mainly for securing parts weighing 150 tons and over.

PRIOR ART

The conventional turntables are designed for lighter workpieces and are provided with a work table which carries the workpiece and is installed rotatably on the circular guide of the carriage which is reciprocated along the guides of a fixed bed. The work table is rotated and the carriage is moved on the bed with the aid of conventional mechanisms suitable for this purpose.

As shown by experience, the known turntables are not sufficiently stiff in the system work table namely the carriage, bed because of the movable joints between these units and their drives.

This leads to the development of backlash and impairs the cutting conditions and the accuracy of the workpiece.

It is also known that the work table is of a rectangular shape which forms cantilevers in relation to the circular guide of the carriage. Hence, if a part, particularly a heavy one, is placed on such a work table, its cantilever part sags. A higher stiffness of the cantilevers requires the increasing of the dimensions of the turntable.

Apart from the above-mentioned disadvantages, the manufacture of such turntables is complicated and calls for a high degree of accuracy in making the friction pairs.

It must also be noted that the known turntables are difficult to operate because the setup motions of the work table take place over the rubbing surfaces of the guides and require a powerful drive.

An object of the present invention resides in eliminating the above mentioned disadvantages.

SUMMARY OF THE INVENTION

The object of the invention is to provide an improved turntable in which the setup motions of the work table require smaller efforts and the work table proper can carry heavier workpieces without a material increase in the size of the turntable.

There is proposed an improved turntable in which the work table carrying a workpiece is installed with a provision for turning and moving horizontally relative to a bed. In accordance with the invention, this object is accomplished by providing a work table which rests on a bed with its lower cylindrical part fitting into a centering hole of a plate mounted on the bed, and with the plate being connected with a drive for its horizontal movement and carrying a drive for turning the work table and clamps for connection therewith. The object is also accomplished by providing a chamber between the lower face surface of the work table and the bed, with the chamber being connected to a source of fluid and filled with the fluid for lifting the work table above the bed when the work table centering hole of the plate or moves jointly with the plate.

The invention is also characterized in that the lower face surface of the work table is provided with a groove extending around the perimeter of the chamber and being open towards the bed, with the groove accommodating a soft seal having an elastic pipe on the top, and the pipe being filled with fluid under pressure for pressing the seal against the bed while the work table is being lifted.

It is desirable that the turntable be provided with stops for limiting the elevation of the work table and leveling the table horizontally.

For turning the work table relative to the bed, the cylindrical part thereof, above the plate, carries a ring gear which coacts with a rotary drive on the plate.

An advantage of the invention is that the chamber which is filled with a liquid or gas under pressure minimizes the forces required for turning the work table when it is lifted above the bed.

Another advantage of the invention is that the cantilever part of the work table can be made more solid thus preventing its deformation and another advantage is that manufacture of the work table is facilitated by lessening the number of precision parts, in particular the omission of the carriage.

Now the invention will be described in detail by way of example with reference to the accompanying drawings in which:

BRIEF DESCRIPTION OF THE DRAWINGS

FIG. 1 is a side view of the turntable according to the invention;

FIG. 2 is a top view of the turntable shown in FIG. 1, partly cut away and turned through 90° with relation to FIG. 1; and FIG. 3 is a view in vertical section of a part of the turntable, with the view being on an enlarged scale.

DETAILED DESCRIPTION OF THE DRAWINGS

As shown in FIGS. 1 and 2, the turntable comprises a work table 1 in the form of a solid 11 each intended for securing the workpieces. Upper part 2 of the work table 1 is rectangular and is provided with a plurality of parallel slots 3 for the installation of the clamps (not shown) which secure the workpieces. Lower cylindrical part 4 of the work table rests directly on a bed 5 and fits into a centering hole 6 of a plate 7 which is mounted on the bed 5. The work table 1 is free to turn in the hole 6 of a plate 7 and is moved by the drive 8 installed on the plate 7 and includes a gear which coacts with a ring gear 9 located above the plate 7 on the cylindrical lower part 4.

The plate 7 can be moved with relation to the bed 5 along guides 10 by means of two drives 11 each having a gear for coacting with toothed racks 12 secured on the plate 7.

Thus, the work table 1 can turn and move horizontally with relation to the plate 7; during the horizontal movement of the work table 1, the plate 7 is jointed thereto by means of clamps 22 of any known design suitable for this purpose.

To facilitate the setup motions of the work table 1 carrying the workpiece, there is a chamber 14 located between a lower face surface 13 (FIG. 3) of the cylindrical part 4 and the bed 5 and is in communication via a channel 15 in the bed 5 with a source of fluid under pressure (not shown). The chamber 14 is provided in the face surface 13 while the fluid filling the chamber may be either gas or liquid fed under a pressure of 3 to 6 atm gauge.

As the chamber 14 is filled with fluid under pressure, the work table 1 rises above the bed 5 and starts floating on a liquid or air cushion which reduces considerably the forces required for the setup motions of the work table 1.

Any probable leakage of the fluid from the chamber 14 is prevented by a groove 16 which extends around the chamber in the lower face surface 13 of the work table 1. The groove 16 is open towards the bed 5 and accommodates a soft seal 17 provided on the top thereof with an elastic pipe 18 and the pipe is connected, via a nipple 19, with the source of fluid under pressure. The seal 17 is pressed, by the fluid pressure in the elastic pipe 18, against the bed 5 when the work table 1 is being lifted.

The lifting of the work table above the bed 5 is limited by stops 20 mounted on the plate 7 and the stops protrude therefrom for cooperating with a collar on flange 21 on the cylindrical part 4 of the work table 1.

It should be noted that the stops are located on the plate 7 around the cylindrical part 4 of the work table 1 and are simultaneously used for leveling the work table 1 horizontally. Therefore, even in the event of an eccentric position of the workpiece on the work table 1, it will always occupy a precise horizontal position.

The turntable operates as follows:

When the workpiece is being fixed on the work table 1 during its machining, the lower face surface 13 of the work table 1 rests directly on the bed 5 and is held against horizontal displacement by clamps secured on the plate 7. If it becomes necessary to turn the work table 1 or to move the table horizontally, the clamps are opened and the chamber 14 and the elastic pipe 18 are filled with fluid under pressure via the channel 15 and nipple 19, respectively. As a result, a lifting liquid or air cushion is developed between the lower face surface 13 of the work table 1 and the bed 5, with such cushion being sealed by the soft seal 17.

If the fluid pressure in the chamber 14 rises above the preset level, the fluid will force off the seal 17 and thus leak. If a liquid is used, special receivers may be provided for collecting the liquid.

When the work table 1 is lifted, the drives 8 and 11 turn and reciprocate the table relative to the bed 5. As has been above stated, the work table 1 is in the form of a solid casting which increases the loading capacity of the turntable without the danger of deformation of it cantilever parts.

An actual realization of the invention has confirmed both the comparative simplicity of manufacture and operation of the turntable, and the above-described advantages.

I claim:

1. A turntable for fastening workpieces during machining comprising: a bed for the turntable; a plate provided with a centering hold mounted on said bed; a work table for securing the workpiece, said work table having a lower cylindrical part extending through the centering hole of said plate, with said cylindrical part bearing against the bed; a drive located on said bed cooperable with said plate for imparting horizontal movement to said plate relative to said bed, a drive on said plate cooperable with said lower cylindrical part for turning said work table in the centering hole of the plate; said plate having clamps for joining said plate with said work table during their joint movement; and means defining a chamber between the cylindrical part of said work table bearing against the bed and the bed communicating with a source of fluid under pressure and filled with fluid for facilitating turning and horizontal movements of the work table.

2. A turntable for fastening workpieces during machining comprising: a bed for the turntable; a plate provided with a centering hole mounted on said bed; a work table for securing the workpiece, said work table having a lower cylindrical part resting on said bed and fitting into the centering hole of said plate; a drive located on said bed cooperable with said plate for imparting horizontal movement to said plate relative to said bed, a drive on said plate cooperable with said lower cylindrical part for turning said work table in the centering hole of the plate; said plate having clamps for joining said plate with said work table during their joint movement; means defining a chamber between a lower face surface of said work table and the bed communicating with a source of fluid under pressure and filled with fluid for lifting said work table above said bed when the work table turns in the centering hole of the plate, or moves jointly therewith, the lower face surface of said work table being provided with a groove extending around the perimeter of said chamber and opening towards said bed; said groove accommodating a soft seal provided on the top with an elastic pipe, and said pipe being filled with fluid under pressure for pressing said seal against the bed when said work table is being lifted.

3. A turntable for fastening workpieces during machining comprising: a bed for the turntable; a plate provided with a centering hole mounted on said bed; a work table for securing the workpiece, said work table having a lower cylindrical part resting on said bed and fitting into the centering hole of said plate; a drive located on said bed cooperable with said plate for imparting horizontal movement to said plate relative to said bed, a drive on said plate cooperable with said lower cylindrical part for turning said work table in the centering hole of the plate; said plate having clamps for joining said plate with said work table during their joint movement; means defining a chamber between a lower face surface of said work table and the bed communicating with a source of fluid under pressure and filled with fluid for lifting said work table above said bed when the work table turns in the centering hole of the plate, or moves jointly therewith, said plate being provided with stops cooperable with said lower cylindrical part for limiting the lift of said work table and leveling said work table horizontally.

* * * * *